(12) United States Patent
Takano et al.

(10) Patent No.: US 9,376,539 B2
(45) Date of Patent: Jun. 28, 2016

(54) URETHANE RESIN COMPOSITION AND A CONDUCTIVE ROLLER USING SAME

(75) Inventors: Junichi Takano, Yokohama (JP);
Mitsuaki Adachi, Yokohama (JP);
Youichi Kotanaka, Yokohama (JP);
Daijirou Sirakura, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 235 days.

(21) Appl. No.: 14/124,554

(22) PCT Filed: May 30, 2012

(86) PCT No.: PCT/JP2012/064000
§ 371 (c)(1),
(2), (4) Date: Dec. 6, 2013

(87) PCT Pub. No.: WO2012/172981
PCT Pub. Date: Dec. 20, 2012

(65) Prior Publication Data
US 2014/0100097 A1 Apr. 10, 2014

(30) Foreign Application Priority Data

Jun. 16, 2011 (JP) ................................. 2011-133822

(51) Int. Cl.
*C08K 5/103* (2006.01)
*C08K 5/1515* (2006.01)
*C08L 75/06* (2006.01)
(Continued)

(52) U.S. Cl.
CPC ............. *C08J 9/142* (2013.01); *C08G 18/0823* (2013.01); *C08J 9/0023* (2013.01); *C08J 9/30* (2013.01); *C08K 5/1515* (2013.01); *C08L 75/06* (2013.01); *F16C 13/00* (2013.01);
(Continued)

(58) Field of Classification Search
None
See application file for complete search history.

(56) References Cited

U.S. PATENT DOCUMENTS

| 5,306,733 A | 4/1994 | Adamski et al. |
| 5,340,842 A | 8/1994 | Adamski et al. |

(Continued)

FOREIGN PATENT DOCUMENTS

| CN | 1898286 A | 1/2007 |
| JP | 52-119697 A | 10/1977 |

(Continued)

OTHER PUBLICATIONS

Machine Translation of WO2005/061571 A1. Jul. 7, 2005.*

(Continued)

*Primary Examiner* — Robert C Boyle
*Assistant Examiner* — Stephen Rieth
(74) *Attorney, Agent, or Firm* — Sughrue Mion, PLLC (57) ABSTRACT

Provided is a urethane resin composition by which an electrically conductive roller which has a higher elasticity than ever and in which an air bubble in an elastic layer is fine can be obtained when the urethane resin composition is used for the elastic layer of the electrically conductive roller, and an electrically conductive roller using the same. The urethane resin composition comprises: a urethane resin having a carboxyl group on a side chain; a cross-linking agent having an epoxy group; and an ester composed of a sugar and an unbranched saturated fatty acid having 16 to 24 carbon atoms as a foaming agent. The saturated fatty acid is preferably a stearic acid. The urethane resin composition preferably further contains a foaming auxiliary. The sugar is preferably a sucrose.

5 Claims, 3 Drawing Sheets (51) Int. Cl.
 G03G 15/02 (2006.01)
 C08J 9/30 (2006.01)
 C08J 9/14 (2006.01)
 F16C 13/00 (2006.01)
 C08J 9/00 (2006.01)
 C08G 18/08 (2006.01)
 C08G 101/00 (2006.01)
(52) U.S. Cl.
 CPC ....... *G03G 15/0233* (2013.01); *C08G 2101/00* (2013.01); *C08J 2201/026* (2013.01); *C08J 2375/04* (2013.01)

(56) References Cited

U.S. PATENT DOCUMENTS

2004/0109992 A1* 6/2004 Gribble ............... B29C 44/569
  428/315.9
2008/0070999 A1 3/2008 Mager et al.

FOREIGN PATENT DOCUMENTS

| JP | 6-267915 A | 9/1994 |
| JP | 9-501980 A | 2/1997 |
| JP | 9-278856 A | 10/1997 |
| JP | 2004-250508 A | 9/2004 |
| JP | 2005-234517 A | 9/2005 |
| JP | 2006-70232 A | 3/2006 |
| JP | 2010-503735 A | 2/2010 |
| WO | 2005061571 A1 | 7/2005 |

OTHER PUBLICATIONS

Machine Translation of JP2006-070232A. Mar. 16, 2006.*
Communication from the Chinese Patent Office dated Oct. 21, 2014 in Chinese Application No. 201280029648.0.
International Search Report of PCT/JP2012/064000, dated Jul. 31, 2012.

* cited by examiner

URETHANE RESIN COMPOSITION AND A CONDUCTIVE ROLLER USING SAME

CROSS REFERENCE TO RELATED APPLICATIONS

This application is a National Stage of International Application No. PCT/JP2012/064000 filed May 30, 2012, claiming priority based on Japanese Patent Application No. 2011-133822, filed Jun. 16, 2011, the contents of which are incorporated herein by reference in their entirety.

TECHNICAL FIELD

The present invention relates to a urethane resin composition and an electrically conductive roller using the same (hereinafter, also simply referred to as "roller"), and more specifically, a urethane resin composition by which an electrically conductive roller which has a higher elasticity than ever and in which an air bubble in an elastic layer is fine can be obtained when the urethane resin composition is used for the elastic layer of the electrically conductive roller, and an electrically conductive roller using the same.

BACKGROUND ART

Generally, in an image forming apparatus using a xerography such as a copier, a printer or a facsimile apparatus, in the image forming steps, a roller to which a conductivity is imparted such as a transfer roller, a developing roller, a toner supply roller, a charge roller, a cleaning roller, an intermediate transfer roller or a belt driving roller is used.

As such a roller member, ones provided with a basic structure having an elastic layer comprising a rubber, polymeric elastomer, polymeric foam or the like given electric conductivity by blending a conductive agent therein, which elastic layer is formed on the outer periphery of the shaft; and further with one or a plurality of layers of the coating films on the outer periphery of the layer to attain a desired surface roughness, electric conductivity, hardness and the like; have been conventionally used.

As a method of manufacturing such an elastic roller provided with one or a plurality of layers of coating films, Patent Document 1 proposes a method in which, in manufacturing an elastic roller composed of a plurality of layers containing an elastic layer provided around a shaft, all these layers are formed by dip coating. By this method, equipment cost can be reduced, and particularly in cases where an elastic roller having a small diameter is used, equipment cost can be considerably reduced.

RELATED ART DOCUMENT

Patent Document

Patent Document 1: Japanese Unexamined Patent Application Publication No. 2005-234517

SUMMARY OF THE INVENTION

Problems to be Solved by the Invention

Among electrically conductive rollers, for example, a charge roller is needed to be in contact with a photoreceptor more softly in order to improve the durability of a photoreceptor or in order to obtain a more uniform image. However, in actual cases, the softer the charge roller is, the more likely the permanent strain is to remain after a load is removed. Therefore, when such a charge roller is left to stand in a state in which the charge roller is pressed for a long time without being rotated, a residual strain at a circumferential direction portion where the charge roller is pressed becomes larger than that at other portion, and the charge roller becomes hard to rotate in a uniform contact state in a subsequent use. As the result, the quality of a printed image is deteriorated. The elastic layer therefore needs to maintain a certain elasticity.

When an elastic layer is manufactured by free foaming, a pore is formed on the surface thereof. In cases where the pore size is large, a coating sinks into a pore during forming another layer on the elastic layer by coating, and the surface of the roller to be finally obtained may also have irregularity. The size of the pore on the surface of the elastic layer, therefore, is preferably fine.

Accordingly an object of the present invention is to provide a urethane resin composition by which an electrically conductive roller which has a higher elasticity than ever and in which an air bubble in an elastic layer is fine can be obtained when the urethane resin composition is used for the elastic layer of the electrically conductive roller, and an electrically conductive roller using the same.

Means for Solving the Problems

In order to solve the above-mentioned problems, the present inventors intensively studied to find the following. Namely, in forming an elastic layer of an electrically conductive roller by soaking (dipping) a shaft in a foaming coating after forming the foaming coating by allowing a coating solution comprising as a main ingredient a water dispersible resin to mechanically generate an air bubble, a carboxyl group contained in a side chain of a urethane resin and an epoxy group contained in a cross-linking agent are reacted with each other to promote crosslinking to form an elastic layer when the elastic layer is urethane foam. However, when the foaming agent contains a carboxyl group, the cross-linking agent is consumed by the carboxyl group, thereby inhibiting crosslinking of the elastic layer. Examples of means for solving such a problem include using a foaming agent composed of a polyether not containing a carboxyl group as a main skeleton. However, since, when a foaming agent composed of a polyether not containing a carboxyl group as a main skeleton is used, an air bubble can not be made sufficiently fine in a foaming process, and the surface of the electrically conductive roller to be obtained thus has irregularity, resulting in a hazy image, which is also problematic.

Based on such findings, the present inventors further intensively studied to find that the above-mentioned problems can be solved by setting the structure of the foaming agent in a urethane resin composition which forms an elastic layer to a predetermined structure, thereby completing the present invention.

Namely, the urethane resin composition of the present invention comprises: a urethane resin having a carboxyl group on a side chain; a cross-linking agent having an epoxy group; and an ester composed of a sugar and an unbranched saturated fatty acid having 16 to 24 carbon atoms as a foaming agent.

In the present invention, the saturated fatty acid is preferably a stearic acid. In the present invention, the urethane resin composition preferably further contains a foaming auxiliary. Further, in the present invention, the sugar is preferably a sucrose. Still further, in the present invention, the foaming auxiliary is preferably an ammonium stearate.

The electrically conductive roller of the present invention is an electrically conductive roller comprising: a shaft; and an elastic layer and a surface layer formed on the outer periphery of the shaft sequentially, characterized in that the elastic layer is formed by using the urethane resin composition of the above-mentioned the present invention.

Effects of the Invention

By the present invention, a urethane resin composition by which an electrically conductive roller which has a higher elasticity than ever and in which an air bubble in an elastic layer is fine can be obtained when the urethane resin composition is used for the elastic layer of the electrically conductive roller, and an electrically conductive roller using the same can be provided.

MODE FOR CARRYING OUT THE INVENTION

A preferred embodiment of a urethane resin composition of the present invention will now be described in detail.
The urethane resin composition of the present invention comprises: a urethane resin having a carboxyl group on a side chain; a cross-linking agent having an epoxy group; and an ester composed of a sugar and an unbranched saturated fatty acid having 16 to 24 carbon atoms as a foaming agent. As mentioned above, in the urethane resin and the cross-linking agent, cross-linking is achieved by the reaction of a carboxyl group present in the urethane resin with an epoxy group present in the cross-linking agent. However, if a carboxyl group is present in the foaming agent, an epoxy group in the cross-linking agent is reacted with a carboxyl group in the foaming agent, which inhibits cross-linking of the urethane resin.
Accordingly, in the present invention, an ester composed of a sugar and an unbranched saturated fatty acid having 16 to 24 carbon atoms is used as the foaming agent. Since, in the foaming agent, a fatty acid which is a hydrophobic group and a sugar which is a hydrophilic group are bonded by a covalent bond, the foaming agent does not have a free carboxyl group which reacts with an epoxy group and the hydrophilic group also does not have a functional group which reacts with an epoxy group. For this reason, the cross-linking agent and the foaming agent are not reacted with each other, and crosslinking reaction between the urethane resin and the cross-linking agent is not inhibited. Therefore, when an elastic layer of an electrically conductive roller is formed by using a urethane resin composition of the present invention, the elastic layer exhibits a higher modulus of elasticity than ever.

Since, unlike a foaming agent having polyether as a main skeleton, in a foaming agent according to the present invention, an air bubble can be made fine in a foaming process, irregularity on the surface of the elastic layer can be prevented, thereby preventing the generation of a hazy image. Regarding the amount of the above-mentioned ingredient, with respect to 100 parts by mass of a urethane resin having a carboxyl group as a side chain, a cross-linking agent having an epoxy group is preferably set to 10 to 50 parts by mass. When the amount of the cross-linking agent exceeds the above range, the cross-linking agent has too many cross-linking points, which may increase the modulus of elasticity of the elastic layer too much. On the other hand, when the amount of the cross-linking agent added falls below the above-mentioned range, a sufficient modulus of elasticity may not be obtained. The amount of the foaming agent is preferably set to 0.5 to 16 parts by mass. Even when the amount of the foaming agent exceeds the above range, the degree of the effect of foaming to be obtained is no longer changed. On the other hand, when the amount of the foaming agent falls below the above-mentioned range, sufficient air bubbles may not be created in the elastic layer.

Specific examples of an unbranched saturated fatty acid having 16 to 24 carbon atoms in a foaming agent according to the present invention include a palmitic acid, a margaric acid, a stearic acid, a tuberculostearic acid, an arachidic acid, a behenic acid, and a lignoceric acid. In the present invention, a stearic acid can be suitably used.

A sugar in a foaming agent according to the present invention is not particularly restricted as long as it is not those having a functional group which reacts with an epoxy group in the cross-linking agent such as a carboxyl group, and examples thereof include: monosaccharides such as dihydroxyacetone, glyceraldehyde, erythrulose, erythrose, ribulose, xylulose, ribose, arabinose, apiose, xylose, lyxose, psicose, fructose, sorbose, tagatose, allose, altrose, glucose, mannose, idose, galactose, fucose, fuculose, and rhamnose; disaccharides such as sucrose, lactose, maltose, trehalose, turanose, and cellobiose; trisaccharides such as raffinose, melezitose, and maltotriose; tetrasaccharides such as acarbose, and stachyose; and oligosaccharides such as fructooligosaccharide, galactooligosaccharide, and mannan oligosaccharide. In the present invention, sucrose can be suitably used.

The urethane resin having a carboxyl group according to the present invention can be manufactured by a known method using a polyol having a carboxyl group or the like and an isocyanate compound. The polyol is not particularly restricted as long as the polyol has two or more hydroxyl groups in the molecule. Examples of the polyol include polyacryl polyol, polyester polyol, and polyether polyol. These may be used alone or two or more of these may be used in combination.

The polyacryl polyol can be obtained, for example, by copolymerization of a (meth)acrylic acid ester and a monomer having a hydroxyl group. Examples of the (meth)acrylic acid ester include (meth)acrylic acid methyl, (meth)acrylic acid butyl, (meth)acrylic acid 2-ethylhexyl, and (meth)acrylic acid cyclohexyl. Examples of a monomer having a hydroxyl group include: hydroxy alkyl esters of an (meth) acrylic acid such as (meth)acrylic acid 2-hydroxyethyl, (meth)acrylic acid 2-hydroxypropyl, (meth)acrylic acid 3-hydroxypropyl, (meth)acrylic acid 2-hydroxybutyl, (meth)

acrylic acid 4-hydroxybutyl, and (meth)acrylic acid 2-hydroxypentyl; (meth)acrylic acid monoesters of polyhydric alcohol such as glycerin, and trimethylolpropane; and N-methylol(meth)acrylamide. These may be used alone or two or more of these may be used in combination.

For the polyacryl polyol, other than a monomer, those obtained by copolymerization with another monomer may be used. The other monomer is not particularly restricted as long as the monomer is copolymerizable. Examples thereof include: an unsaturated monocarboxylic acid such as a (meth) acrylic acid; an unsaturated dicarboxylic acid such as a maleic acid; and anhydride and mono- or di-esters thereof; unsaturated nitriles such as (meth)acrylonitrile; unsaturated amides such as (meth)acrylamide, N-methylol(meth)acrylamide; vinylesters such as vinyl acetate, and propionic acid vinyl; vinyl ethers such as methylvinyl ether; α-olefins such as ethylene, and propylene; a halogenated α,β-unsaturated aliphatic monomer such as vinyl chloride, and vinylidene chloride; and an α,β-unsaturated aromatic monomer such as styrene, and α-methylstyrene. These may be used alone or two or more of these may be used in combination.

For the polyester polyol, for example, those obtained by reacting a polybasic acid with a polyol component can be used. Examples of the polybasic acid include: aromatic dicarboxylic acids such as an ortho-phthalic acid, an isophthalic acid, a terephthalic acid, a 1,4-naphthalenedicarboxylic acid, a 2,5-naphthalenedicarboxylic acid, a 2,6-naphthalenedicarboxylic acid, a biphenyldicarboxylic acid, and a tetrahydro phthalic acid; aliphatic dicarboxylic acids such as an oxalic acid, a succinic acid, a malonic acid, a glutaric acid, an adipic acid, a pimelic acid, a suberic acid, an azelaic acid, a sebacic acid, a decanedicarboxylic acid, a dodecanedicarboxylic acid, an octadecanedicarboxylic acid, a tartaric acid, an alkylsuccinic acid, a linoleic acid, a maleic acid, a fumaric acid, a mesaconic acid, a citraconic acid, and an itaconic acid; alicyclic dicarboxylic acids such as a hexahydro phthalic acid, a tetrahydro phthalic acid, a 1,3-cyclohexanedicarboxylic acid, and a 1,4-cyclohexanedicarboxylic acid; and reactive derivatives of the anhydrides, alkyl esters, or acid halides. These may be used alone or two or more of these may be used in combination.

Examples of the polyol component include ethylene glycol, 1,2-propanediol, 1,3-propanediol, 1,3-butanediol, 1,4-butanediol, neopentylglycol, pentanediol, 1,6-hexanediol, 1,8-octanediol, 1,10-decanediol, 1-methyl-1,3-butyleneglycol, 2-methyl-1,3-butyleneglycol, 1-methyl-1,4-pentylene glycol, 2-methyl-1,4-pentylene glycol, 1,2-dimethyl-neopentylglycol, 2,3-dimethyl-neopentylglycol, 1-methyl-1,5-pentylene glycol, 2-methyl-1,5-pentylene glycol, 3-methyl-1,5-pentylene glycol, 1,2-dimethylbutyleneglycol, 1,3-dimethylbutyleneglycol, 2,3-dimethylbutyleneglycol, 1,4-dimethylbutyleneglycol, diethylene glycol, triethylene glycol, polyethyleneglycol, dipropylene glycol, polypropyleneglycol, 1,4-cyclohexanedimethanol, 1,4-cyclohexanediol, bisphenolA, bisphenolF, hydrogenated bisphenol A, and hydrogenated bisphenol F. These may be used alone or two or more of these may be used in combination.

For the polyether polyol, for example, those obtained by adding an alkylene oxide to polyhydric alcohol by ring-opening polymerization can be used. Examples of the polyhydric alcohol include ethylene glycol, diethylene glycol, propylene glycol, dipropylene glycol, glycerin, and trimethylolpropane. Examples of the alkylene oxides include ethylene oxide, propylene oxide, butylene oxide, styrene oxide, and tetrahydrofuran. These may be used alone, or two or more of the above may be used in combination.

Examples of polyisocyanate include: aliphatic diisocyanate such as tetramethylenediisocyanate, dodecamethylenediisocyanate, 1,4-butanediisocyanate, hexamethylene diisocyanate, 2,2,4-trimethylhexamethylene diisocyanate, 2,4,4-trimethylhexamethylene diisocyanate, lysinediisocyanate, 2-methylpentane-1,5-diisocyanate, and 3-methylpentane-1,5-diisocyanate; alicyclic diisocyanate such as isophorone diisocyanate, hydrogenated xylylenediisocyanate, 4,4'-cyclohexylmethanediisocyanate, 1,4-cyclohexanediisocyanate, methylcyclohexylenediisocyanate, 1,3-bis(isocyanatemethyl)cyclohexane; aromatic diisocyanate such as tolylene diisocyanate, 2,2'-diphenylmethane diisocyanate, 2,4'-diphenylmethane diisocyanate, 4,4'-diphenylmethane diisocyanate, 4,4'-diphenyldimethylmethanediisocyanate, 4,4'-dibenzyldiisocyanate, 1,5-naphthylenediisocyanate, xylylenediisocyanate, 1,3-phenylenediisocyanate, and 1,4-phenylenediisocyanate; and aromatic aliphatic diisocyanate such as dialkyldiphenylmethane diisocyanate, tetraalkyldiphenylmethane diisocyanate, and α,α,α,α-tetramethylxylylenediisocyanate. These may be used alone, or two or more of the above may be used in combination.

The urethane resin having a carboxyl group according to the present invention can be obtained, for example, by reacting a chain extender having a free carboxyl group, in addition to the above-mentioned polyol and the above-mentioned polyisocyanate. Examples of the chain extender having a free carboxyl group include a dihydroxycarboxylic acid, and a dihydroxy succinic acid. Examples of the dihydroxycarboxylic acid include: dialkylol alkanoic acids such as a dimethylol alkanoic acid (for example, a dimethylol acetic acid, a dimethylol butanoic acid, a dimethylol propionic acid, a dimethylol butyric acid, and a dimethylol pentane acid). These may be used alone, or two or more of the above may be used in combination.

In manufacturing an urethane resin having a carboxyl group according to the present invention, another polyol, and another chain extender may be added in addition to the above-mentioned components. Examples of the other polyol include polyol having three or more hydroxyl groups such as sorbitol, 1,2,3,6-hexane tetraol, 1,4-sorbitan, 1,2,4-butane triol, 1,2,5-pentane triol, glycerin, trimethylolethane, trimethylolpropane, and pentaerythritol. Examples of the other chain extender include: glycols such as ethylene glycol, diethylene glycol, triethylene glycol, 1,3-propanediol, 1,3-butanediol, 1,4-butanediol, neopentylglycol, pentanediol, 1,6-hexanediol, and propylene glycol; aliphatic diamine such as ethylenediamine, propylenediamine, hexamethylenediamine, 1,4-butanediamine, and aminoethylethanolamine; alicyclic diamine such as isoholondiamine, and 4,4'-dicyclohexylmethanediamine; and aromatic diamine such as xylylenediamine and tolylene diamine.

For a method of manufacturing an urethane resin having a carboxyl group according to the present invention, any known method may be used. Although, for example, a one shot method in which the above-mentioned components are reacted at once or a multistep method in which reactions are performed stepwisely may be used, the multistep method is preferred from the viewpoint of easily introducing a carboxyl group. During manufacturing an urethane resin having a carboxyl group, an urethane reaction catalyst may be used.

The number average molecular weight of the urethane resin having a carboxyl group according to the present invention is preferably several tens of thousands to several hundreds of thousands. By setting the number average molecular weight to the above-mentioned range, when the urethane resin composition is a below-mentioned dipping liquid, the viscosity is easy to be adjusted.

Examples of the cross-linking agent having an epoxy group according to the present invention include: a reaction product of polyhydric alcohols such as diethylene glycol.diglycidyl ether, polyethyleneglycol.diglycidyl ether, polypropyleneglycol.diglycidyl ether, neopentylglycol.diglycidyl ether, 1,6-hexanediol.diglycidyl ether, glycerol.polyglycidyl ether, trimethylolpropane.polyglycidyl ether, polyglycerol.polyglycidyl ether, pentaerythiol.polyglycidyl ether, diglycerol.polyglycidyl ether, and sorbitol.polyglycidyl ether, and epichlorohydrin; novolac epoxy resin such as phenol novolac epoxy resin, and cresol novolac epoxy resin; and bisphenol A epoxy resin, but not restricted thereto. In the present invention, these may be used alone, or two or more of the above may be used in combination.

In the urethane resin composition of the present invention, an alkali metal salt or an ammonium salt of a higher fatty acid, an alkali metal salt or an ammonium salt of an alkylsulfonic acid or the like is preferably contained as a foaming auxiliary. In particular, stearic acid ammonium is suitable. The amount of foaming auxiliary added is 0.5 to 16 parts by mass, and suitably 0.5 to 8 parts by mass with respect 100 parts by mass of a urethane resin having a carboxyl group as a side chain.

It is important for the urethane resin composition of the present invention only that the composition contains a urethane resin having a carboxyl group on a side chain, and an ester composed of a sugar and an unbranched saturated fatty acid having 16 to 24 carbon atoms as a foaming agent. Other additives are not particularly restricted as long as the additive is those not having a functional group which reacts with a carboxyl group in a cross-linking agent. Since the urethane resin composition of the present invention can be suitably used for an elastic layer of an electrically conductive roller, other known additives which are usually added to an elastic layer of an electrically conductive roller can be added.

When the urethane resin composition of the present invention is used for an elastic layer of an electrically conductive roller, a conductive agent can be added to a urethane resin composition. By this, the conductivity is imparted to the layer, or the conductivity is adjusted to obtain a predetermined resistance value. Such a conductive agent is not particularly restricted, and examples thereof include cationic surfactants such as quaternary ammonium salts such as perchlorates, chlorates, fluoroborates, sulphates, ethosulfates and benzyl halides such as benzyl bromides, benzyl chlorides of lauryltrimethyl ammonium, stearylmethyl ammonium, octadodecyl trimethyl ammonium, hexadecyl trimethyl ammonium, denatured fatty acid.dimethyl ethyl ammonium; anionic surfactants such as fatty series sulfonic acid salts, higher alcohol sulfate ester salts, higher alcohol ethylene oxide adduct sulfate ester salts, higher alcohol phosphate ester salts, higher alcohol ethylene oxide adduct phosphate ester salts; antistatic agents such as nonionic antistatic agents such as higher alcohol ethylene oxides, polyethylene glycol fatty acid esters, polyalcohol fatty acid esters; electrolytes such as salts of group 1 metals in periodic table such as $Li^+$, $Na^+$, $K^+$ such as $NaClO_4$, $LiAsF_6$, $LiBF_4$, NaSCN, KSCN, NaCl, or salts of $NH4^+$; or electroconductive carbons such as ketjen black and acetylene black; carbons for rubber such as SAF, ISAF, HAF, FEF, GPF, SRF, FT and MT; oxidation-treated carbons for color (ink); pyrolytic carbons; natural graphite; artificial graphite; metals and metal oxides such as antimony-doped tin oxides, titanium oxides, zinc oxides, nickel, copper, silver, and germanium; electroconductive polymers such as polyaniline, polypyrrole and polyacetylene. These conductive agents may be used alone or two or more of these may be mixed and used. The amount of such conductive agents to be added is appropriately selected depending on the type of the composition, and usually adjusted such that the volume resistivity of the elastic layer is $10^0$ to $10^8$ Ω·cm, preferably $10^2$ to $10^6$ Ω·cm.

To the urethane resin composition of the present invention, other than the above-mentioned conductive agents, a known additive such as a wetting agent, a foam stabilizer, a curing agent, a thickener, a defoamer, a leveling agent, a dispersing agent, a thixotropic agent, an antiblocking agent or a film formation aid may be added in an appropriate amount, as required. Among these, as the wetting agent, for example, a silicone surfactant such as a polyether-modified silicone can be favorably used. The polyether-modified silicone has a structure in which a part of alkyl group in poly(dialkylsiloxane) is replaced by a substitute having a polyoxyalkylene group. Examples of such a polyether-modified silicone include dimethylpolysiloxane polyoxyalkylene copolymer. By containing a wetting agent in the elastic layer, a leveling effect which is the intrinsic effect of the wetting agent can be obtained, as well as, coarsening of the foaming cell can be inhibited and the foam size can be made fine. In addition, foaming amount of the coating at free foaming can be more precisely controlled. The amount of such a wetting agent to be added is preferably 0.1 to 2 parts by mass with respect to 100 parts by mass of urethane resin. When the amount of the wetting agent to be added is too large, gelation of the coating tends to occur. On the other hand, when the amount of the wetting agent to be added is too small, a desired effect may not be sufficiently obtained.

Next, the electrically conductive roller of the present invention will be described.

Figure 1:
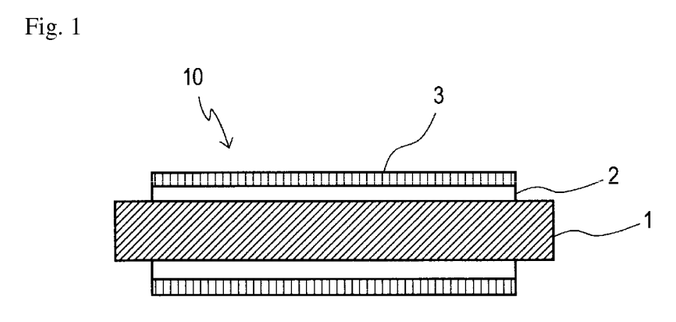
FIG. 1 is a cross section illustrating one example of an electrically conductive roller of the present invention in the longitudinal direction.

FIG. 1 is a cross section illustrating one example of an electrically conductive roller of the present invention in the longitudinal direction. As illustrated, an electrically conductive roller 10 of the present invention comprises a shaft 1, an elastic layer 2 and a surface layer 3 formed sequentially on the outer periphery thereof.

It is important for the electrically conductive roller 10 of the present invention that the elastic layer 2 is formed by using the above-mentioned urethane resin composition of the present invention. Since, in the electrically conductive roller 10 of the present invention, the elastic layer 2 is formed by using a urethane resin composition of the present invention, the elastic layer 2 has a higher modulus of elasticity than ever. Since an air bubble in the elastic layer 2 is fine, generation of an hazy image can be prevented.

The thickness of the elastic layer 2 is preferably 0.8 to 1.5 mm, and more preferably, 1.0 to 1.3 mm. By setting the thickness of the elastic layer 2 to the above range, a spark discharge can be prevented. The expansion ratio of the elastic layer 2 is not particularly restricted, and is preferably about 1.2 to 10 times, and more preferably, 1.5 to 2.2 times. The density is preferably about 0.4 to 0.6 g/cm$^3$.

In the present invention, as the shaft 1, a hollow cylinder or solid cylinder made of metal or plastics can be used, and preferably a hollow cylinder or solid cylinder made of metal, and more preferably a hollow cylinder made of metal can be used. By using this, the cost can be reduced.

In the present invention, the surface layer 3 provided on the elastic layer 2 is preferably formed by using a water-based coating. For a water-based coating used for the surface layer 3, a rubber or a resin which is known as a material for a roller or the like can be employed. Examples of the resin include a urethane-modified acrylic resin, polyurethane resin, acrylic resin, acrylic silicone resin, polyamide resin and fluorine resin, and these resins can be used alone or two or more of these can be used in combination. As the water-based rubber coating, latex such as natural rubber (NR), chloroprene rubber (CR), nitrile rubber (NBR), styrene butadiene rubber (SBR) can be preferably used; as the water-based polyurethane resin coating, an ether or ester emulsion or dispersion can be preferably used; as the water-based acrylic resin coating, emulsion such as acrylic, acrylic styrene can be preferably used; and as the water-based fluorine resin coating, polytetrafluoroethylene, tetrafluoroethylene-perfluoroalkylvinylether copolymer, tetrafluoroethylene-ethylene copolymer, polychlorotrifluoroethylene, chlorotrifluoroethylene-ethylene copolymer, tetrafluoroethylene-vinylidenefluoride copolymer, polyvinylidene fluoride, polyvinyl fluoride or the like can be preferably used.

In the present invention, among the above, a water-based acrylic resin is suitable for the water-based coating. Examples of such a water-based acrylic resin preferably include those having acrylonitrile and n-butyl acrylate as essential components and optionally having other monomers. Examples of the other monomers include ethyl acrylate, acrylic acid 2-ethylhexyl, acrylic acid, methacrylic acid. The resin has acrylonitrile and n-butyl acrylate as essential components because these contribute to the improvement of the elasticity (setting properties). From this point of view, it is preferred that the amount of n-butyl acrylate be increased as much as possible; the amount of other components be decreased as much as possible; and the monomer ratio of the other monomer components than the essential components be decreased. On the other hand, when the ratio of the acrylonitrile is too high, the formed layer or the like becomes hard, which is not desirable. The monomer ratio of n-butyl acrylate to acrylonitrile which is a necessary component is, therefore, preferably in a range of 1 to 25:99 to 75, in particular 5 to 20:95 to 80 based on molar ratio.

The above-mentioned water-based acrylic resin is preferably contains a group having in the molecular an active hydrogen. Examples of the groups having an active hydrogen include a carboxyl group, a hydroxyl group and an amino group, and preferably a carboxyl group. The ratio of the monomer containing such an active hydrogen is preferably 3 to 6% by mass of the total amount of the monomers. By setting the ratio of monomers containing groups having an active hydrogen in this range, a water-based acrylic resin whose surface acid value is adjusted to not smaller than 10 mg/g, for example, 10 to 20 mg/g can be suitably used.

To the water-based coating which forms the surface layer 3, a conductive agent is added, which is not restrictive, whereby the conductivity (electric resistance) is imparted to the surface layer 3 or the conductivity can be adjusted. The conductive agent used in this case is not particularly restricted, and the same agents used for the elastic layer 2 can be appropriately used alone or two or more of these can be used in mixture. The amount of these conductive agents added is appropriately selected depending on the types of the composition, and usually, the volume resistivity of the surface layer 3 is adjusted to $1\times10^4$ to $1\times10^{12}$ Ω·cm, preferably $1\times10^6$ to $1\times10^8$ Ω·cm.

To the water-based coating which forms this surface layer 3, an additive such as a cross linking agent, a thickener, a thixotropic agent or a structural viscosity agent may be added as required.

The thickness of the surface layer 3 is not particularly restricted thereto, and may be set to usually 1 to 30 μm, particularly 1 to 20 μm. If the thickness is smaller than 1 μm, the durability of the roller is sometimes poor, and on the other hand, if the thickness is larger than 20 μm, there are cases where a good surface quality may not be obtained such as a case where electrification characteristics or the like is negatively affected and a case where wrinkle occurs on the surface.

Figure 2:
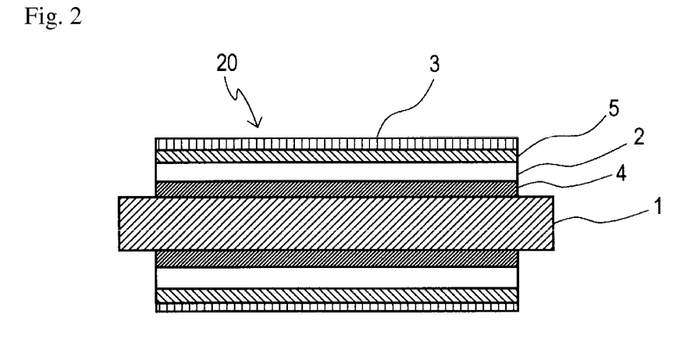
FIG. 2 is a cross section illustrating another example of an electrically conductive roller of the present invention in the longitudinal direction.

An electrically conductive roller 10 of the present invention at least comprises the surface layer 3 on the above-mentioned elastic layer 2. As required, between the elastic layer 2 and the surface layer 3, a resistance adjusting layer 5 can be provided as an intermediate layer; and further, between the elastic layer 2 and the resistance adjusting layer 5, an adhesion layer can be placed. Further, by providing an adhesion layer on the periphery of a shaft 1 prior to the formation of the elastic layer 2, the adhesiveness between the shaft 1 and the elastic layer 2 can be improved. FIG. 2 is a cross-sectional view illustrating another configuration example of an electrically conductive roller of the present invention. An electrically conductive roller 20 as illustrated comprises the shaft 1, and the adhesion layer 4, the elastic layer 2, the resistance adjusting layer 5 and the surface layer 3 which are formed on the periphery of the shaft 1 in the order mentioned.

The above-mentioned resistance adjusting layer 5 can be formed by a resin composition in which a conductive agent is added to the resin. The resin which constitutes this resin composition is not particularly restricted, and examples thereof include urethane resin, acrylic urethane resin, acrylic resin, ester resin, nylon resin, phenolic resin, epoxy resin, fluorine resin and silicone resin. One of these may be used, or two or more of these may be used in mixture. Among these, a water-based coating such as urethane resin, acrylic urethane resin, acrylic resin is preferably used. As the conductive agent which is added to this water-based coating, the same conductive agent as used in the elastic layer 2 can be used.

The resistance adjusting layer 5 is optionally provided in order to adjust the electric resistance value of the electrically conductive roller. The resistance value of the resistance adjusting layer 5 is appropriately set depending on the resistance value of the elastic layer 2 or the resistance value needed for the roller, and may be usually in a range of $1\times10^3$ to $1\times10^8$ Ω·cm, and particularly $1\times10^5$ to $1\times10^7$ Ω·cm. In this case, the amount of the conductive agent to be added may be an amount in which this resistance value is attained, and is usually 0.1 to 20 parts by mass, particularly 1 to 10 parts by mass with respect to 100 parts by mass of the base resin of the water-based coating.

To the resistance adjusting layer 5, a variety of additives other than the conductive agents can be added without departing from an object of the present invention. For example, a crosslinker such as one based on oxazoline, epoxy, melamine, guanamine, isocyanate or phenol can be added in an appropriate amount depending on the base resin to be used. Other known additives such as a film formation aid, a dispersing agent, a thickener, a leveling agent, a thixotropic agent and a structural viscosity agent may be added in an appropriate amount.

The thickness of the resistance adjusting layer 5 is appropriately selected depending on the thickness of the elastic layer 2 or the shape of the electrically conductive roller or the like, and not particularly restricted. The thickness is preferably usually 10 to 500 μm, and particularly 50 to 300 μm. When the thickness of the resistance adjusting layer 5 is smaller than 50 μm, it sometimes becomes difficult to sufficiently adjust the resistance value. On the other hand, when the thickness of the resistance adjusting layer 5 is larger than 300 μm, the thickness of the elastic layer becomes relatively small, whereby the hardness of the roller (hardness of a member) sometimes becomes high or the cost sometimes becomes higher than necessary.

The adhesion layer 4 can be optionally provided in order to strongly bond between the shaft 1 and the elastic layer 2, or between the elastic layer 2 and the resistance adjusting layer 5, and the thickness thereof may be about 1 to 100 μm. The adhesion layer 4 can by formed, for example, by using a resin material such as acrylic resin, urethane resin, acrylic urethane resin, polyester resin or polyamide resin.

Figure 3:
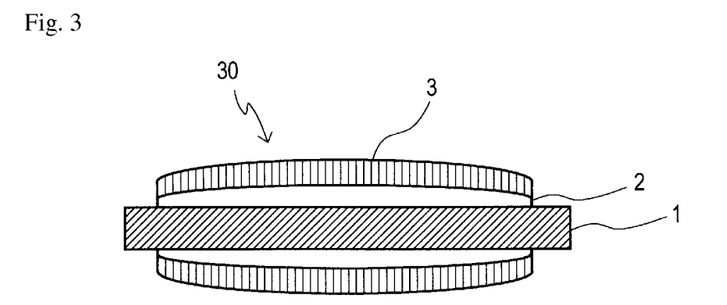
FIG. 3 is a cross section illustrating still another example of an electrically conductive roller of the present invention in the longitudinal direction.

FIG. 3 is a cross-sectional view illustrating still another example of an electrically conductive roller of the present invention in the longitudinal direction. Since it is important that a uniform working face be formed in the longitudinal direction when the electrically conductive roller is pressed on the photoconductor drum when an electrically conductive roller is used as a chrge roller or the like, the illustrated electrically conductive roller 30 of a preferred embodiment has a crown shape whose diameter at the center portion in the longitudinal direction is larger than those at the end portions.

When the electrically conductive roller has a crown shape, as a crown amount which represents the degree of the protrusion at the center in the roller length direction in the cross section of the roller longitudinal direction, 50 to 300 μm is preferably employed. By this, normal images may be made more preferable. If the crown amount is smaller than 50 μm, the contact pressure at the center of the roller in the roller length direction becomes low, while if the crown amount is larger than 300 μm, the portion at the center of the roller in the roller length direction makes too strong contact. Both cases possibly cause failures such as ununiformity of the charge amount. The measurement of the crown amount of the electrically conductive roller of the present invention can be performed by using High Precision Laser Measuring Machine LSM-430v manufactured by Mitutoyo Corporation. External diameters at the center portion and at 90 mm from the center portion in the direction from the center portion to the end portion were measured by this measuring machine, and a roller crown amount is defined as the difference between the external diameter at the center portion and the average of the external diameters at 90 mm from the center portion in the directions from the center portion to the end portions. For example, for an electrically conductive roller having a roller length of 250 mm, external diameters are measured at three point, at 35 mm, 125 mm and 215 mm from one end of the roller. In this case, the crown amount (μm) is calculated by the following formula (1):

$$\text{Crown amount (μm)} = \{B - (A+C)/2\} \times 1000 \qquad (1),$$

where the external diameter at 35 mm from one end of the roller is A (mm), the external diameter at 125 mm from one end of the roller is B (mm) and the external diameter at 215 mm from one end of the roller is C (mm).

The electrically conductive roller of the present invention preferably has a deviation (precision of film thickness) of not larger than 70 μm in the whole range in the roller length direction. In cases where the electrically conductive roller is used as a charge roller to be revolved which being in contact with the photoreceptor, and the photoreceptor are revolving, and when the deviation of the electrically conductive roller is large, a gap between the electrically conductive roller, and the photoreceptor is generated. Further, the gap distance varies. In this case, toner particle and external additives which remain on the photoreceptor are likely to intrude into the gap and then attached irregularly on the electrically conductive roller. As a result, the surface of the roller becomes mottled with the remain, which produces an image with a low quality. It is noted that the measurement of the deviation of the electrically conductive roller of the present invention was performed by using High Precision Laser Measuring Machine LSM-430v manufactured by Mitutoyo Corporation. The external diameters for five points in the roller length direction were measured by this measuring machine, and a deviation was defined as the average of the difference between the maximum value and the minimum value of the measured external diameter for each point.

Next, a method of manufacturing an electrically conductive roller will be described.

Each layer of the electrically conductive roller of the present invention can be formed by using a known method such as dipping method, a spraying method, a roll coater method, a die coating method, or a ring coating method, and preferably, all layers are formed by dip coating. Conventionally, other than a dip coating apparatus for forming a surface layer or the like, an extruder or a metal mold is needed when an elastic layer is formed by extrusion molding or metal molding. In this method, only a dip coating apparatus is needed, and equipment cost required for manufacturing an elastic roller can be largely reduced. In particular, in the case of a roller having a small diameter, an elastic roller can be formed with a small number of layers, which is more advantageous.

Figure 4:
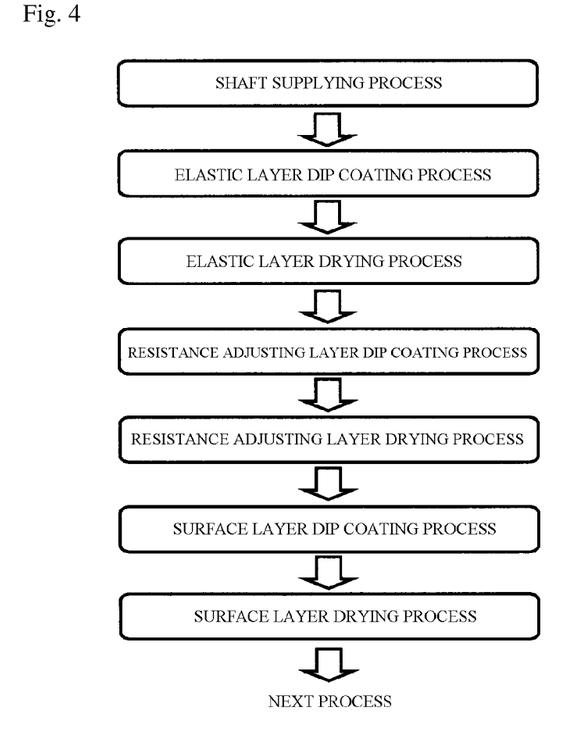
FIG. 4 is a process chart illustrating one preferred process flow in which an electrically conductive roller of the present invention is manufactured.

FIG. 4 is a process chart illustrating one preferred process flow in which an electrically conductive roller 20 of the type illustrated in FIG. 2 is manufactured. Based on FIG. 4, a method of manufacturing an electrically conductive roller 20 will be described. The illustrated manufacturing process comprises: a shaft supplying process in which a shaft 1 is prepared to be supplied; an elastic layer dip coating process in which the shaft 1 is dip coated with an elastic layer 2; an elastic layer drying process in which the elastic layer 2 is forced dried; a resistance adjusting layer dip coating process in which the outside of the elastic layer 2 in the radial direction is dip coated with a resistance adjusting layer 5; a resistance adjusting layer drying process in which the resistance adjusting layer 5 is forced dried; a surface layer dip coating process in which the outside of the resistance adjusting layer 5 in the radial direction is dip coated with a surface layer 3; and a surface layer drying process in which the surface layer 3 is forced dried. The electrically conductive roller 20 finished with the surface layer drying process is transferred to a next process such as an inspection process.

In cases where another layer is formed between the elastic layer 2 and the resistance adjusting layer 5 or between the resistance adjusting layer 5 and the surface layer 3, a process of dip coating the other layer and a subsequent process of drying the dip coated layer may be provided between the elastic layer drying process and the resistance adjusting layer dip coating process or between the resistance adjusting layer drying process and the surface layer dip coating process. By repeating dip coating and drying sequentially from the inner layer in the radial direction, the electrically conductive roller 20 can be formed.

When such a layer is formed by dip coating, industrially, a method in which a plurality of, 30 or more, rollers are hung vertically on a hanger, these rollers are simultaneously soaked in a solution of materials constituting each layer and pulled out, and these rollers are dried by blowing is usually employed. In this case, temperature control of a coating or a roller to be coated at the time of coating and strict control of blowing conditions for drying are important for obtaining a favorable layer.

As apparatuses for carrying out the above-mentioned process, a dipping bath which is filled with a solution for dip coating each layer, a blower for drying a dipped layer, a temperature adjusting bath for controlling the temperature of the roller in the midst of forming in each process, and a conveyor for conveying a roller are needed. In cases where electrically conductive rollers of a plurality of sizes are sequentially produced by switching, preferably apparatuses such as a dipping bath are commonly used in different sizes.

A solvent for preparing the above-mentioned solution may be appropriately selected depending on the type of the material constituting each layer. When the elastic layer 2 is formed, water is used as a solvent. When a fluorine resin is used for a base resin of the other layer such as the surface layer 3, methyl ethyl ketone (MEK), methyl isobutyl ketone (MIBK), toluene, xylene or the like is suitably used.

When a thick elastic layer is formed, it is preferred that an amount of as thick a coating attached as possible in one dip coating be attained from the viewpoint of productivity. In order to attain this, for example, a thickener in which cellulose is dispersed is added to the coating and mixed, then a shaft 1 is soaked in a solution in which the coating is dissolved to form a thick elastic layer, thereby attaining an amount of a thick coating attached.

Regarding the control of coating temperature, it is preferred that a dipping bath be provided with a heater and a temperature sensor, and that the coating temperature at the time of coating is preferably kept nearly constant in a range of 25 to 35° C. Specifically, dipping coating is preferably performed in a state in which a coating is maintained in a range of ±1° C. in the above-mentioned temperature range. Regarding the control of the temperature of a roller, all rollers immediately before soaking a coating are preferably adjusted to nearly uniform temperature by a heater or a warm air. More Specifically, it is preferred that a roller be heated at a temperature of 30° C. or higher, and that the variation in the temperature of each roller be ±1° C. from the average temperature of all the rollers. In addition, regarding blowing conditions, it is preferred that drying is performed by blowing a plurality of rollers hung on a hanger from downward to upward. Further preferably, the variation of the speed of air flow at each point on the surface of all the rollers is within ±0.1 m/s. By performing the control of the temperature of the coating, the control of the temperature of the roller and the control of blowing conditions,
a resistance adjusting layer 5, a surface layer 3, an adhesive layer 4 or the like can be favorably formed without causing dripping or webbing of a coating, or generation of air bubble.

Figure 5:
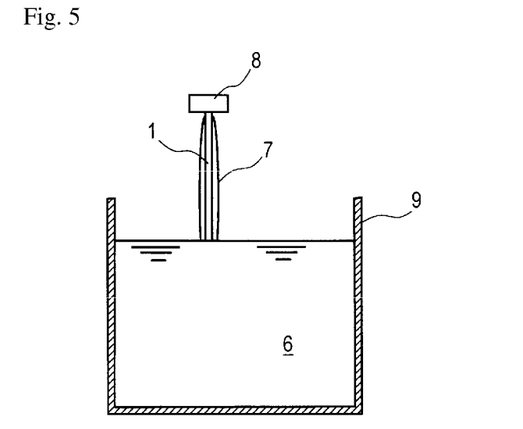
FIG. 5 is a schematic diagram of a dipping bath illustrating a state in progress in which an elastic layer is formed by pulling a shaft from a solution.

FIG. 5 is a schematic diagram of a dipping bath illustrating a state in progress in which an elastic layer is formed by pulling a shaft 1 from a solution. The illustrated electrically conductive roller is an electrically conductive roller 30 having a crown shape of a type shown in FIG. 3. It is important for the electrically conductive roller 30 to form a uniform working face in the length direction when the roller is pressed against a photoconductor drum. For this reason, a crown shape in which a diameter at a center portion in the length direction is larger than that at an end portion is preferred. As illustrated in FIG. 5, by controlling the amount of an elastic layer 7 in progress of formation attached such that the elastic layer 2 is thick at a center portion in the length direction and such that the elastic layer 2 is thin at an end portion in the length direction by changing the speed of pulling the shaft 1 hung on a hanger 8 from a solution 6 of a dipping bath 9 depending on the position of pulling, the electrically conductive roller 30 having a crown shape can be formed. In this case, there is no need to change the thicknesses of a resistance adjusting layer and a surface layer. For example, in cases where an electrically conductive roller having a crown shape is formed by making the thickness of a resistance adjusting layer or a surface layer thick at a center portion in the length direction and thin at an end portion in the length direction, deviation of electrical characteristics in the length direction which may be generated due to the thinness of these layers can be prevented.

In the manufacture of an electrically conductive roller of the present invention, when a foaming coating is prepared by foaming a urethane resin composition of the present invention used when an elastic layer is formed, a mechanical froth method, a water foaming method and a foaming agent froth method can be adopted. A mechanical froth method in which foaming is performed by mechanical stirring while an inert gas is mixed in is preferred. The below-mentioned method is particularly preferred because an air bubble in an elastic layer can be made fine. The mechanical froth method will now be described.

Figure 6:
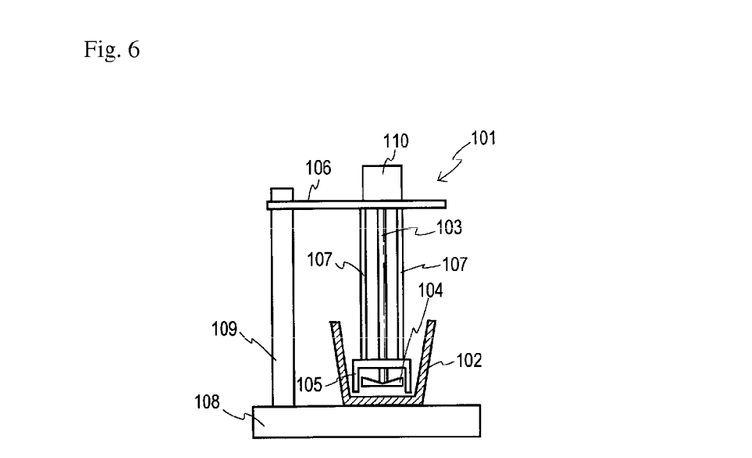
FIG. 6 is a schematic diagram of one example of a stirring apparatus for manufacturing a foaming coating.

FIG. 6 is a schematic diagram of one example of a stirring apparatus for manufacturing a foaming coating by foaming a urethane resin composition of the present invention by a mechanical froth method. A container 102 of a stirring apparatus 101 in the figure accommodates therein a urethane resin composition of the present invention.

A rotation axis 103 which transmits a rotation driving force for stirring a urethane resin composition in the container 102 extends in the vertical direction, and a tip portion of the rotation axis 103 in the downward direction or a bottom portion thereof is positioned in the container 102. At the vicinity of the bottom portion of the rotation axis 103, a stirring blade 104 is attached and fixed. By the rotation of the rotation axis 103, the stirring blade 104 creates a flow of the urethane resin composition at the vicinity of the rotation axis 103 in a direction along the rotation axis 103. Specifically, when the rotation axis 103 rotates in a normal rotation direction, a flow direction of the urethane resin composition is a direction from the bottom surface of the container 102 toward the liquid surface. On the contrary, when the rotation axis 103 rotates in a reverse rotation direction, a flow direction of the urethane resin composition is a direction from the liquid surface toward the bottom surface of the container 102.

Around the stirring blade 104, a fixed cylindrical body 105 having a cylindrical shape is provided adjacent to the stirring blade 104. In an example of the illustrated stirring apparatus 101, the fixed cylindrical body 105 is supported and fixed by a plurality of supporting bars 107 extending from a beam 106 above the fixed cylindrical body 105 toward the fixed cylindrical body 105. The beam 106 is attached at the vicinity of the top of a pillar 109 which is provided upright from a base 108 of the stirring apparatus 101.

The beam 106 is provided with a motor 110 which is connected to the upper end portion of the rotation axis 103 and which can rotate the rotation axis 103 in any of a normal rotation direction and a reverse rotation direction.

By using the stirring apparatus 101 having such a constitution, a urethane resin composition of the present invention accommodated in the container 102 is stirred. In this case, first, the stirring blade 104 of the stirring apparatus 101 is rotated such that the flow direction of the urethane resin composition at the vicinity of rotation axis 103 is from the liquid surface to the bottom surface of the container 102 (reverse rotation operation) to foam the urethane resin composition. Then, the direction of rotation of the stirring blade 104 is changed, and the stirring blade 104 is rotated such that the flow direction of the urethane resin composition at the vicinity of rotation axis 103 is from the bottom surface of the container 102 to the liquid surface (normal rotation operation) to make an air bubble fine.

Figure 7:
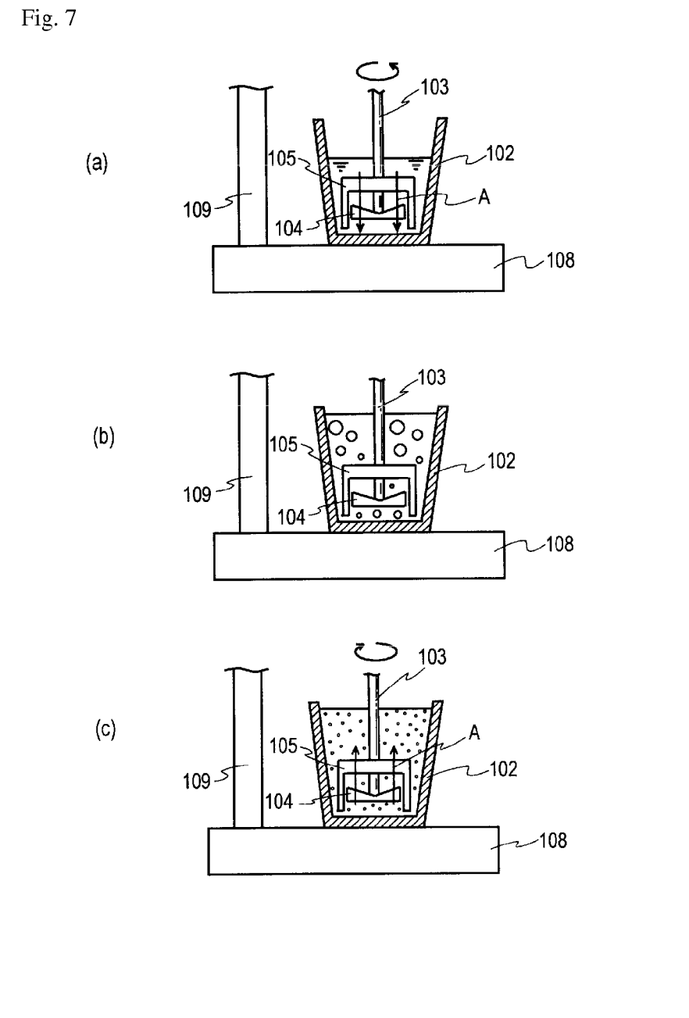
FIG. 7 is a schematic diagram of the vicinity of a container of the stirring apparatus of FIG. 6.

A method of foaming an air bubble and a method of making the air bubble fine will be described in detail. First, in cases where the stirring blade 104 is rotated in a reverse rotation direction of the rotation axis 103 in the fixed cylindrical body 105, or in cases where the flow direction of the urethane resin composition at the vicinity of the rotation axis 103 is from the liquid surface to the bottom surface as illustrated in an arrow A in the figure, a vortex is generated around the rotation axis 103 by the stirring blade 104 at a rotation speed of about 5000 to 15000 rpm and an air is involved from the liquid surface of the urethane resin composition to generate an air bubble. The position of the stirring blade 104 is preferably at nearly the same distance from the bottom surface of the container 102 and from the liquid surface of the urethane resin composition at the start of foaming.

A state in which an air bubble is generated is schematically illustrated in FIG. 7(b). By the generation of an air bubble, the volume of the urethane resin composition becomes large. The deviation of the diameter of the generated air bubble is large. When the magnification of the volume of the urethane resin composition after foaming with respect to the volume of the urethane resin composition before foaming, or the volume magnification becomes a predetermined value, for example, two times (the specific gravity of the foam is 0.5), rotation of the stirring blade 104 is stopped. By adjusting the volume magnification, the specific gravity of the foam to be manufactured can be adjusted.

Then, in cases where the stirring blade 104 is rotated in a normal rotation direction of the rotation axis 103 in the fixed cylindrical body 105, or in cases where the flow direction of the urethane resin composition at the vicinity of the rotation axis 103 is from the bottom surface to the liquid surface as illustrated in an arrow A in FIG. 7(c), a shear force is applied to an air bubble in the urethane resin composition by the stirring blade 104 in the fixed cylindrical body 105 at a rotation speed of about 2000 to 8000 rpm to make the air bubble fine.

Since, by the above-mentioned manufacturing method, an air bubble foamed by the reverse rotation operation of the stirring blade 104 can be made fine by the normal rotation operation of the stirring blade 104, a foam having a fine air bubble and having a small deviation of the diameter of the air bubble can be manufactured.

The stirring apparatus 101 used in the above-mentioned manufacturing method has a shape in which the stirring blade 104 and the fixed cylindrical body 105 generate an air bubble by involving an air during the reverse rotation operation as mentioned above, and a shear force is applied thereto by the stirring blade 104 in the fixed cylindrical body 105 during the normal rotation operation, thereby making the air bubble fine. The fixed cylindrical body 105 may be provided with a hole penetrating the side surface thereof in the thickness direction. As a stirring apparatus 101 having the stirring blade 104 and the fixed cylindrical body 105 having the above-mentioned individual shapes, for example, a disperser for a liquid, or a one called HOMO MIXER can be applied.

In cases where the direction of the rotation of the stirring blade is changed from the reverse rotation operation to the normal rotation operation, it is preferred that the rotation of the stirring blade be stopped when, after foaming the urethane resin composition, the magnification of the volume of the urethane resin composition after foaming with respect to the volume of the urethane resin composition before foaming reaches a predetermined magnification. This is because, by stopping the rotation at the time when a predetermined volume magnification of foaming as a target expansion ratio is attained, any target specific gravity of a foam to be manufactured can be controlled. By this, the specific gravity of the foam can be adjusted easily and precisely.

The rotation speed of the stirring blade when the urethane resin composition is foamed by the reverse rotation operation is preferably 5000 to 15000 rpm. When the rotation speed is lower than 5000 rpm, the urethane resin composition can not be sufficiently foamed, which is not preferred from the viewpoint of production efficiency. When the rotation speed is higher than 15000 rpm, a considerable amount of heat caused by a shear energy applied to the coating is generated, which is not preferred from the viewpoint that crosslinking reaction or film formation easily occurs due to the heat. More preferably, the rotation speed is in a range of 8000 to 10000 rpm.

The rotation speed of the stirring blade when a foam of the urethane resin composition is made fine by the normal rotation operation is preferably 2000 to 8000 rpm. The higher the rotation speed, the finer the air bubble can be made. When the rotation speed is lower than 2000 rpm, the air bubble can not be made sufficiently fine, and a uniform electric conductivity can not be attained, which is not preferred. When the rotation speed is higher than 8000 rpm, the liquid flow becomes too strong, an air is newly involved from the open air and the control of the specific gravity becomes difficult, which is not preferred. More preferably, the rotation speed is in a range of 4000 to 6000 rpm.

As mentioned above, the manufacturing method of an electrically conductive roller is described by taking electrically conductive rollers 20, 30 as examples. For other electrically conductive rollers, a method of dip coating all layers can be used and similar effects can be obtained.

EXAMPLES

The present invention will now be described in detail by way of Examples.

To 100 parts by mass of water-based coating (a water emulsion of acrylonitrile-acrylic acid alkyl ester-methacrylic acid-methacrylic acid glycidyl copolymer), 5 parts by mass of EPOCROS (emulsion of oxazoline group containing styrene-acrylic copolymer), 10 parts by mass of water dispersion carbon, 7.5 parts by mass of Fineseal X-12 (hydrophilic silica), 1 parts by mass of SN Defoamer 777 (defoamer), 1 parts by mass of SN Wet 970 (wetting agent), 1.6% by mass of UH420 (thickener) were added to be stirred by a stirrer. The water-based coating to which all of the ingredients were added was filtrated by a mesh to remove aggregate. The shaft 1 was subjected to a dipping coating with this water-based coating and to heat drying, thereby forming an adhesion layer 4 having a thickness of 100 μm on the periphery of the shaft 1.

Next, urethane resin compositions of Examples 1 to 6 and Comparative Examples 1 to 8 were prepared by formulations (parts by mass) listed on Tables 1 and 2 below. First, a urethane resin composition was measured in an amount of 230 g in a container and stirred by a stirrer for 30 minutes. Thereafter, the composition was left to stand still for 24 hours, and the resin raw material was foamed by rotating a stirring blade in a direction in which a resin raw material liquid flows from the liquid surface to the bottom surface of the container at 5000 rpm for 10 minutes by using HOMO MIXER (T. K. ROBOMIX manufactured by PRIMIX Corporation). Thereafter, an air bubble was made fine by rotating the stirring blade at 4000 rpm for 5 minutes such that the resin raw material flows from the bottom surface of the container to the liquid surface, thereby obtaining a urethane foam water dispersion liquid. The details of the foaming agents 1 to 9 used are listed on the Table 3. The obtained urethane foam water dispersion liquid was coated by dipping on the above-mentioned shaft 1 on which an adhesive layer was formed in advance, then dried and hardened in a heated air oven to form an elastic layer having a layer thickness of 1.2 mm.

Next, to 100 parts by mass of a water-based coating (acrylic silicon resin, EX102SI, manufactured by NIPPON SHOKUBAI CO., LTD.), 70 parts by mass of 2,2,4-trimethyl-1,3-pentanediol monoisobutylate (manufactured by Chisso Corporation, CS-12), 8 parts by mass of aqueous silicone graft acrylic polymer (manufactured by Toagosei Co., Ltd., Symac US-450), 27 parts by mass of polyether modified polydimethyl siloxane (manufactured by BYK Japan KK, BYK-333), 2 parts by mass of a fluorine containing nonionic surfactant (manufactured by NEOS COMPANY LIMITED, Ftergent 215M) and 10 parts by mass of SILICA (manufactured by TOKUYAMA corporation, FINE SEAL X-12), 15 parts by mass of Nylon particles (manufactured by Aica Kogyo Company, Limited, GANZ PEARL GPA-550), 10 parts by mass of aqueous dispersion of a black organic pigment (BONJET BLACK CW-3 (manufactured by ORIENT CHEMICAL INDUSTRIES CO., LTD.) were added to be stirred by a stirrer. The obtained water-based coating was applied on the above-mentioned elastic layer 2 by dipping coating and dried for 30 minutes at room temperature and for 20 minutes at 110° C. to form the surface layer 3, thereby obtaining each electrically conductive roller.

For the obtained rollers, the average of cell diameter, and the standard deviation of cell diameter of the elastic layer, the hollow rate of the elastic layer and whether a hazy image is generated or not were evaluated.

<Measurement of Average Cell Diameter of Elastic Layer>

From each of the obtained rollers, an elastic layer was cut out in a thickness of 1.2 mm, and diameters of cells were measured at 30 points in descending order on a screen of DIGITAL MICROSCOPE (manufactured by KEYENCE CORPORATION VHX-100) to determine the average and the standard deviation thereof. The obtained results are listed on the Tables 1 and 2.

<Measurement of Elastic Layer Hollow Rate>

On a foamed elastic layer sheet formed in a thickness of 1 mm thickness, a cylinder weight having φ6 mm is placed, and a load of 500 gf was applied thereon to be left to stand still under a high temperature and a high humidity at 40° C.×95% for three days. Thereafter, the sheet was taken out and a weight trace was cut out such that the cross-section thereof can be observed. The hollow amount at the loaded portion and the thickness at the non-loaded portion were measured by DIGITAL MICROSCOPE, and calculation was performed by using the formula below:

Hollow rate=Hollow amount/Non-loaded portion thickness.

The obtained results are listed on Tables 1 and 2. When the elastic layer hollow rate is 3% or lower, the elasticity of an elastic layer can be considered good.

<Hazy Image Evaluation>

CRG307 which incorporated an electrically conductive roller was set in a printer LBP5000 manufactured by Canon Inc., and then printing was performed in a halftone pattern to confirm whether a haze was generated. When a haze was generated, the evaluation was designated as "×", and when a haze was not generated, the evaluation was designated as "○". The results are listed on Tables 1 and 2.

TABLE 1

|  | Comparative Example 1 | Example 1 | Comparative Example 2 | Comparative Example 3 | Comparative Example 4 | Comparative Example 5 | Comparative Example 6 |
|---|---|---|---|---|---|---|---|
| Urethane resin | 100 | 100 | 100 | 100 | 100 | 100 | 100 |
| Foam stabilizer | 6 | 6 | 6 | 6 | 6 | 6 | 6 |
| Wetting agent | 0.5 | 0.5 | 0.5 | 0.5 | 0.5 | 0.5 | 0.5 |
| Antifoaming agent | 0.5 | 0.5 | 0.5 | 0.5 | 0.5 | 0.5 | 0.5 |
| Conductive agent | 17 | 17 | 17 | 17 | 17 | 17 | 17 |
| Cross-linking agent | 35 | 35 | 35 | 35 | 35 | 35 | 35 |
| Waterproofing agent | 5 | 5 | 5 | 5 | 5 | 5 | 5 |
| Foaming agent 1 | 16 | — | — | — | — | — | — |
| Foaming agent 2 | — | 16 | — | — | — | — | — |
| Foaming agent 3 | — | — | 16 | — | — | — | — |
| Foaming agent 4 | — | — | — | 16 | — | — | — |
| Foaming agent 5 | — | — | — | — | 16 | — | — |
| Foaming agent 6 | — | — | — | — | — | 16 | — |
| Foaming agent 7 | — | — | — | — | — | — | 16 |
| Foaming agent 8 | — | — | — | — | — | — | — |
| Foaming agent 9 | — | — | — | — | — | — | — |
| Foaming auxiliary | — | — | — | — | — | — | — |
| Average cell diameter (μm) | 69 | 85 | 120 | 105 | 73 | 165 | 105 |
| Standard deviation of cell diameter | 17 | 33 | 60 | 39 | 39 | 95 | 43 |
| Elastic layer hollow rate (%) | 17 | 0 | 6 | 5 | —* | 5 | 4 |
| Existence of hazy image | ○ | ○ | x | ○ | —* | x | x |

*Evaluation was not available due to the occurrence of crack at the time when a film is manufactured.

TABLE 2

|  | Comparative Example 7 | Comparative Example 8 | Example 2 | Example 3 | Example 4 | Example 5 | Example 6 |
|---|---|---|---|---|---|---|---|
| Urethane resin | 100 | 100 | 100 | 100 | 100 | 100 | 100 |
| Foam stabilizer | 6 | 6 | 6 | 6 | 6 | 6 | 6 |

TABLE 2-continued

|  | Comparative Example 7 | Comparative Example 8 | Example 2 | Example 3 | Example 4 | Example 5 | Example 6 |
|---|---|---|---|---|---|---|---|
| Wetting agent | 0.5 | 0.5 | 0.5 | 0.5 | 0.5 | 0.5 | 0.5 |
| Antifoaming agent | 0.5 | 0.5 | 0.5 | 0.5 | 0.5 | 0.5 | 0.5 |
| Conductive agent | 17 | 17 | 17 | 17 | 17 | 17 | 17 |
| Cross-linking agent | 35 | 35 | 35 | 35 | 35 | 35 | 35 |
| Waterproofing agent | 5 | 5 | 5 | 5 | 5 | 5 | 5 |
| Foaming agent 1 | — | — | — | — | — | — | — |
| Foaming agent 2 | — | — | 0.5 | 8 | 8 | 8 | 8 |
| Foaming agent 3 | — | — | — | — | — | — | — |
| Foaming agent 4 | — | — | — | — | — | — | — |
| Foaming agent 5 | — | — | — | — | — | — | — |
| Foaming agent 6 | — | — | — | — | — | — | — |
| Foaming agent 7 | — | — | — | — | — | — | — |
| Foaming agent 8 | 16 | — | — | — | — | — | — |
| Foaming agent 9 | — | 16 | — | — | — | — | — |
| Foaming auxiliary | — | — | — | — | 2 | 3 | 5 |
| Average cell diameter (μm) | 99 | 180 | 90 | 88 | 78 | 76 | 77 |
| Standard deviation of cell diameter | 48 | 52 | 50 | 36 | 26 | 22 | 19 |
| Elastic layer hollow rate (%) | 6 | 4 | 2 | 0 | 0 | 1 | 3 |
| Existence of hazy image | x | x | ○ | ○ | ○ | ○ | ○ |

TABLE 3

|  |  |  | Main component skeleton | |
|---|---|---|---|---|
|  | Trade Name | Manufacturer | Hydrophobic group (fatty acid) | Hydrophilic group (counterpart) |
| Foaming agent 1 | Nopco DC-100-A | SAN NOPCO LIMITED | Stearic acid | Ammonium |
| Foaming agent 2 | Cosmetic-like S-160 | DAI-ICHI KOGYO SEIYAKU CO., LTD | Stearic acid | Sucrose |
| Foaming agent 3 | Cosmetic-like L-160 | DAI-ICHI KOGYO SEIYAKU CO., LTD. | Lauric acid | Sucrose |
| Foaming agent 4 | ST-K | MIYOSHI OIL & FAT CO., LTD. | Stearic acid | Potassium |
| Foaming agent 5 | NONSAL OK-2 | NOF CORPORATION | Oleic acid | Potassium |
| Foaming agent 6 | NONSAL PK-1 | NOF CORPORATION | Palmitic acid | Potassium |
| Foaming agent 7 | ST-Na | MIYOSHI OIL & FAT CO., LTD. | Stearic acid | Sodium |
| Foaming agent 8 | NOIGEN GIS125 | DAI-ICHI KOGYO SEIYAKU CO., LTD. | Isostearic acid | Polyoxyethylene glyceryl |
| Foaming agent 9 | NONION S202 | NOF CORPORATION | Polyoxyethylene stearyl ether | |

Urethane resin: ADEKA BONTIGHTER HUX-950 (manufactured by ADEKA CORPORATION)
Foam stabilizer: Neogen S-20D (manufactured by DAI-ICHI KOGYO SEIYAKU CO., LTD.)
Wetting agent: SN WET 125 (manufactured by SAN NOPCO LIMITED)
Antifoaming agent: SN DEFOAMER 777 (manufactured by SAN NOPCO LIMITED)
Conductive agent: BSYD15007 (manufactured by MIKUNI COLOR LTD.)
Cross-linking agent: DENACOL EX-313 (manufactured by Nagase ChemteX Corporation)
Waterproofing agent: AZ coat 5800MT (manufactured by SAN NOPCO LIMITED)
Foaming auxiliary: NOPCO DC-100-A (manufactured by SAN NOPCO LIMITED)

From the results in Table 1 and 2, it is found that the electrically conductive roller on which an elastic layer was formed by using a urethane resin composition of the present invention had a high elasticity and an air bubble was fine, and therefore, the generation of a hazy image can be prevented. In view of Examples 3 to 6, by using a foaming auxiliary in combination, the average of the cell diameter and the deviation (standard deviation of cell diameter) of the cell diameter can be made small while maintaining the hollow rate of the elastic layer not higher than 3%.

DESCRIPTION OF SYMBOLS

1 Shaft
2 Elastic layer
3 Surface layer
4 Adhesive layer
5 Resistance adjusting layer
6 Solution
7 Elastic layer in the midst of forming
8 Hanger
9 Dipping bath 10,20,30 Electrically conductive roller
101 Stirring apparatus
102 Container
103 Rotation axis
104 Stirring blade
105 Fixed cylindrical body
106 Beam
107 Supporting bar
108 Base
109 Pillar

The invention claimed is:

1. A urethane resin composition comprising: a urethane resin having a carboxyl group on a side chain; a cross-linking agent having an epoxy group; and an ester comprising a sugar and an unbranched saturated fatty acid having 16 to 24 carbon atoms as a foaming agent, wherein the sugar is a sucrose.

2. The urethane resin composition according to claim 1, wherein the saturated fatty acid is a stearic acid.

3. The urethane resin composition according to claim 1, which contains a foaming auxiliary.

4. The urethane resin composition according to claim 3, wherein the foaming auxiliary is an ammonium stearate.

5. An electrically conductive roller comprising: a shaft; and an elastic layer and a surface layer formed on the outer periphery of the shaft sequentially, characterized in that the elastic layer is formed by using the urethane resin composition according to claim 1.

\* \* \* \* \*